US008379688B2

(12) United States Patent
Kravtsov et al.

(10) Patent No.: US 8,379,688 B2
(45) Date of Patent: Feb. 19, 2013

(54) METHOD AND APPARATUS ADAPTED FOR LOCALIZED HOPPING OFDMA AND POWER EFFICIENT OFDMA MULTIPLEXING

(75) Inventors: Vladimir Kravtsov, Jerusalem (IL); Tom Harel, Kibutz Shfaim (IL)

(73) Assignee: Intel Corporation, Santa Clara, CA (US)

( * ) Notice: Subject to any disclaimer, the term of this patent is extended or adjusted under 35 U.S.C. 154(b) by 1026 days.

(21) Appl. No.: 12/025,389

(22) Filed: Feb. 4, 2008

(65) Prior Publication Data

US 2009/0196328 A1  Aug. 6, 2009

(51) Int. Cl.
*H04B 1/713* (2011.01)
(52) U.S. Cl. ........................................ 375/135; 375/260
(58) Field of Classification Search .................. 375/132, 375/135, 260
See application file for complete search history.

(56) References Cited

U.S. PATENT DOCUMENTS

| 6,246,713 | B1* | 6/2001 | Mattisson ..................... 375/132 |
| 2005/0163194 | A1 | 7/2005 | Gore et al. |
| 2007/0223365 | A1 | 9/2007 | Tsfaty et al. |

FOREIGN PATENT DOCUMENTS

| CN | 1267153 A | 9/2000 |
| CN | 101505289 A | 8/2009 |
| EP | 1909403 A3 | 4/2008 |
| EP | 2031888 A1 | 3/2009 |
| EP | 2086154 A1 | 8/2009 |
| JP | 2009-201105 A | 3/2009 |
| WO | 2006/134947 A1 | 12/2006 |
| WO | 2007/071998 A1 | 6/2007 |
| WO | 2007/148583 A1 | 12/2007 |

OTHER PUBLICATIONS

Svensson, T. et al. B-IFDMA—A Power Efficient Multiple Access Scheme for Non-Frequency-Adaptive Transmission, IEEE 16th IST Mobile and Wireless Communications Summit 2007, Jul. 1-5, 2007, pp. 1-5.
Harjani, R. et al, Analog/RF Physical Layer Issues for UWB Systems, Proc. IEEE 17th International Conference on VLSI Design, Jan. 5-9, 2004, pp. 941-948.
Guo, Yanpeng et al. Frequency Hopping F-QPSK for Power and Spectrally Efficient Cellular Systems, Proc. Vehicular Technology Conference on Personal Communication—Freedom Through Wireless Technology, Conf. 43, May 18-20, 1993, pp. 799-802.
European Patent Application No. 09250243.4 filed Jan. 29, 2009, EP Office Action dated Mar. 3, 2010. 6 pp.
Office Action received for Japanese Patent Application No. 2009-019668 mailed on Oct.04, 2011, 3 pages of Office Action and 3 pages of English Translations.
Office Action received for Chinese patent Application No. 200910005781.2, mailed on May 18, 2011, 2 pages of Office Action Including 1 page of English Translation.
Office Action received for Chinese patent application No. 2009100057812, mailed on Nov. 24, 2011, 18 pages of Office Action including 13 pages of English Translation.

(Continued)

*Primary Examiner* — Kevin Kim
(74) *Attorney, Agent, or Firm* — Thorpe North & Western, LLP

(57) ABSTRACT

An embodiment of the present invention provides an apparatus, comprising a transceiver configured for OFDM transmissions in frequency-contiguous, hopping, sub-channels.

12 Claims, 4 Drawing Sheets

OTHER PUBLICATIONS

Office Action received for Japanese Patent Application No. 2009-019668, mailed on Mar. 6, 2012, 4 pages of Office action including 2 pages of English Translation.

Office Action received for European Application Serial No. 09250243.4-1237, mailed on Mar. 9, 2010, 6 pages.

Office Action received for European Application Serial No. 09250243.4-1237, mailed on Apr. 25, 2012, 5 pages.

LG Electronics, "Basic performance results for uplink OFDMA and SC-FDMA", 3GPP TSG-RAN WG1 #42 R1-050834, Aug. 29-Sep. 2, 2005, 5 pages.

* cited by examiner

METHOD AND APPARATUS ADAPTED FOR LOCALIZED HOPPING OFDMA AND POWER EFFICIENT OFDMA MULTIPLEXING

BACKGROUND

In wireless communications, uplink power deficits are a significant problem for emerging cellular data services. This problem arises from the following combination of cellular operators' targets: higher radio frequencies (than those of the voice service); higher bit rates; deep indoor penetration; and co-location with the existing voice-BS infrastructure.

Multi-tone modulation (OFDM) is attractive, as it is immune to channel dispersion and spectrally efficient; but the power deficit is especially hard with OFDM. The reason is the poor Peak-to-Average Power Ratio (PAPR) (the signal amplitude is Rayleigh-distributed, even in the case of QPSK-modulated tones). In the last case, PA back-off is limited by out-of-band emission; to meet regulatory spectral mask, it must be ~10 dB.

Thus, a strong need exists for improvements in wireless communication systems, methods and apparatus.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
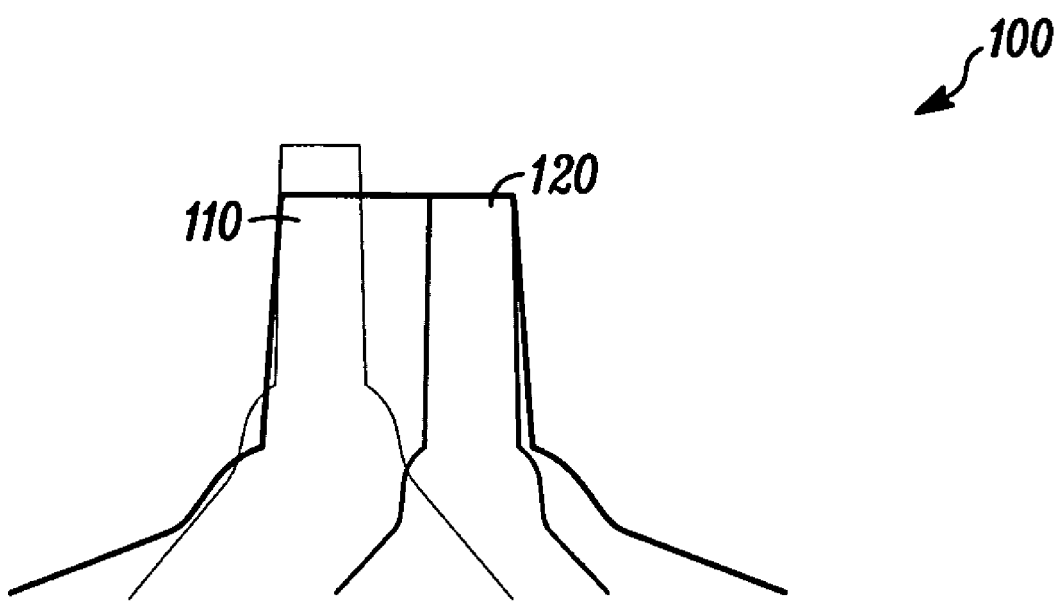
FIG. 1 illustrates how the out of band emission shrinks proportionally in an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

An embodiment of the present invention provides and apparatus and method for multipoint-to-point OFDMA radio transmission (e.g. WiMax Uplink) with reduced transmission back-off. In an embodiment of the present invention, the method works by division of a total RF channel into frequency-contiguous, hopping, relatively narrow sub-channels, each one being used by single transmitter. Transmissions may be highly non-linear, but inter-modulation products remain inside the total channel and they don't violate out-of-band emission mask nor create unacceptable error vector magnitude (EVM)/cross-talk.

In an embodiment of the present invention, specifically for IEEE 802.16 (a.k.a WiMax) the present invention proposes to enable an up link (UL) rotation scheme to Adaptive Modulation and Coding (AMC) permutation (currently UL rotation scheme can only be applied to UL Partial Usage of Subchannels (PUSC)), which will provide a localized allocation with hop every 3 symbols. In an embodiment of the present invention, the present invention particularly applies to WiMAX using an AMC and UL rotation scheme.

Multi-tone modulation (OFDM) is attractive, as it is immune to channel dispersion and spectrally efficient; but the power deficit is especially hard with OFDM. The reason is the poor Peak-to-Average Power Ratio (PAPR) (the signal amplitude is Rayleigh-distributed, even in the case of QPSK-modulated tones). In the last case, PA back-off is limited by out-of-band emission; in order to meet regulatory spectral mask, it must be ~10 dB.

Embodiments of the present invention solve the power deficit problem by means of Localized Highly-Non-Linear OFDM, and adds diversity by means of frequency hopping. This way the present invention does not compromise modulation immunity to the channel dispersion, and attain Link Budget improvement ~6 dB (vs. non-localized OFDM).

For power deficient WiMax users, embodiments of the present invention provide OFDM transmissions in frequency-contiguous, hopping, relatively narrow sub-channels (e.g. each user transmits over up to ⅕ of the total BW, such that one can obey spectral mask limitation) with PA back-off up to 0 dB. The "windowing and overlapping" of OFDMA symbols shouldn't be done at the hop boundary.

Embodiments of the present invention provide frequency hopping of the user's localized allocation, without changing the carrier frequency. Therefore the users remain orthogonal to each other and there is no need for extra guard band in time (in the hop boundaries) or frequency. The advantage of the transmission is scheme is the ability of user to transmit more power than he can transmit with full BW allocation.

Due to sub-channel contiguity, inter-modulation products don't violate the spectral mask. Said another way, since the bandwidth of the signal shrinks, assuming memory-less distortion, the out of band emission shrinks proportionally 110 to 120 as depicted FIG. 1, generally as 100.

The output of PA may be represented as a sum of Output Signal (proportional to the input) and Auto-Interference (zero-correlated with the input). Due to Rayleigh-distributed input's amplitude, the power of Auto-Interference turns out to be relatively small (although the signal shape may be severely distorted). OFDM receivers make FFT transforms of the received symbol. Doing this, it disperses Auto-Interference over tones (almost) uniformly; more accurately, Auto-Interference+Interference from the adjacent sub-channels=const in a flat channel.

Thus we may define $$\text{Effective\_SNR} = \frac{\text{Signal} \cdot \text{PathGain}}{N_0 + \text{AutoInterference} \cdot \text{PathGain}}.$$

As the present invention is not limited by the spectral mask, with a given path gain we may choose PA back-off to maximize Effective SNR.

Figure 2:
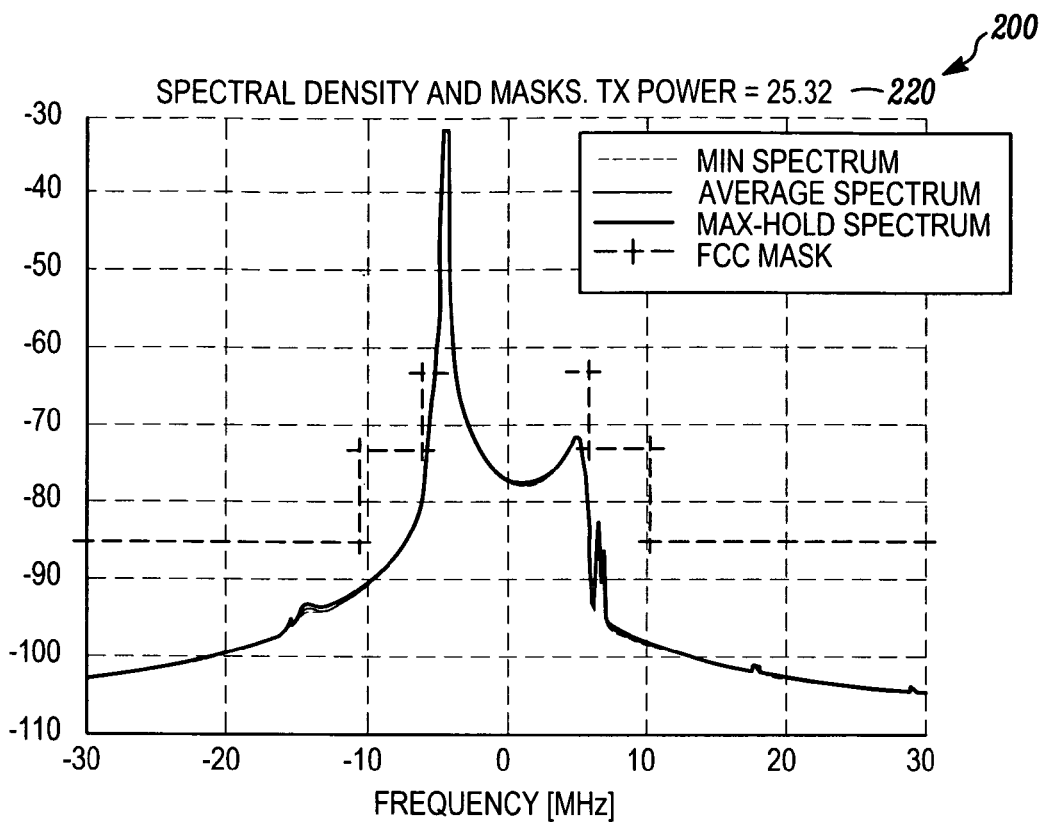
FIG. 2 shows a simulation of results depicting the spectrum of each hop separately (at the edge and at the center) of an embodiment of the invention.
Figure 2:
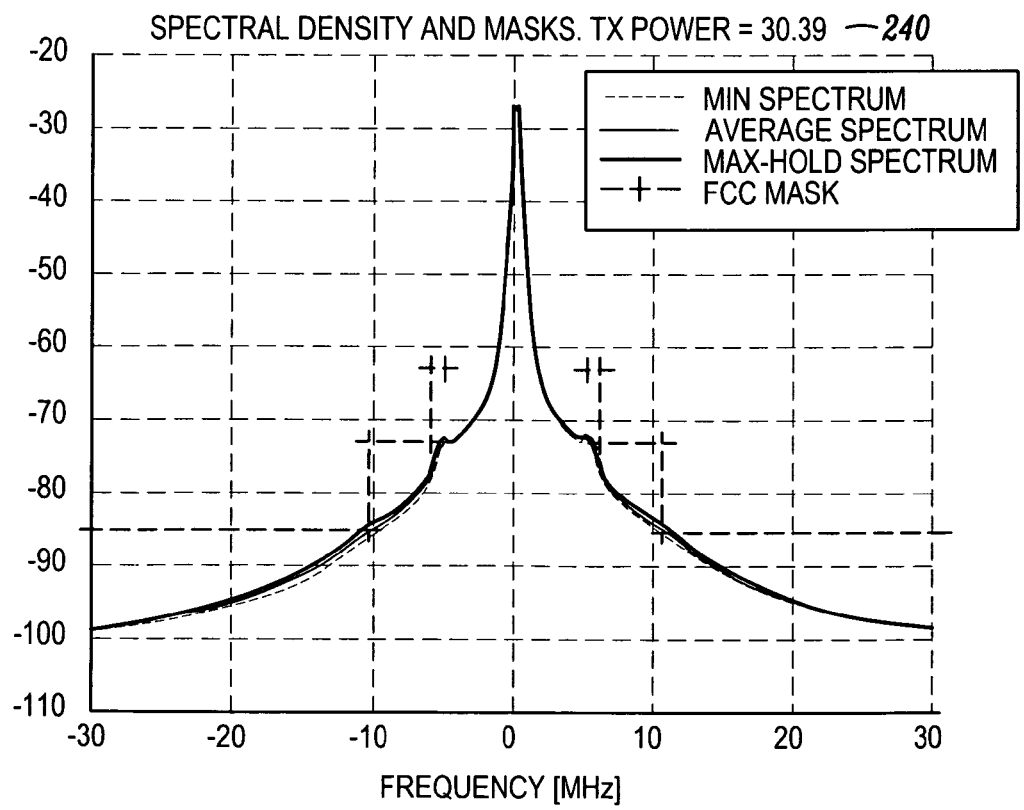

Turning now to FIG. 2 at 200 is a simulation of results depicting the spectrum of each hop (220 and 240) separately (at the edge and at the center), when passed through RAPP3 PA model. The maximum power that conforms to the FCC spectral mask is 25.3 dBm 220 and 30.4 dBm 240 for edge and center allocation respectively, while for regular OFDM/OFDMA signal maximum 23 dBm can be transmitted.

Figure 3:
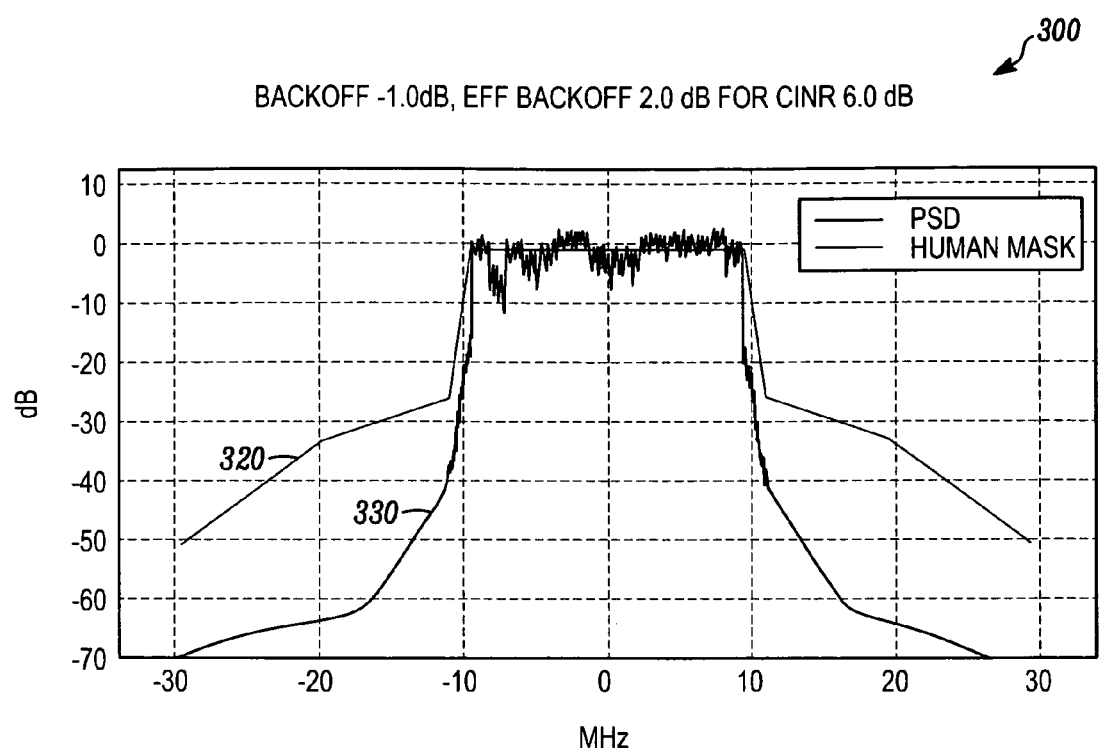
FIG. 3 is s graphical illustration of the average spectrum over multiple hop intervals of an embodiment of the present invention.

Looking now at FIG. 3 at 300 is the graphical illustration of the average spectrum over multiple hop intervals. In this way the present invention can attain ~5 dB Effective SNR (which provides robust 1 bit/Hz transmission) with 1 dB PA back-off; to get the same Effective SNR with 9 dB back-off, we would need extra 6 dB of the path gain.

Figure 4:
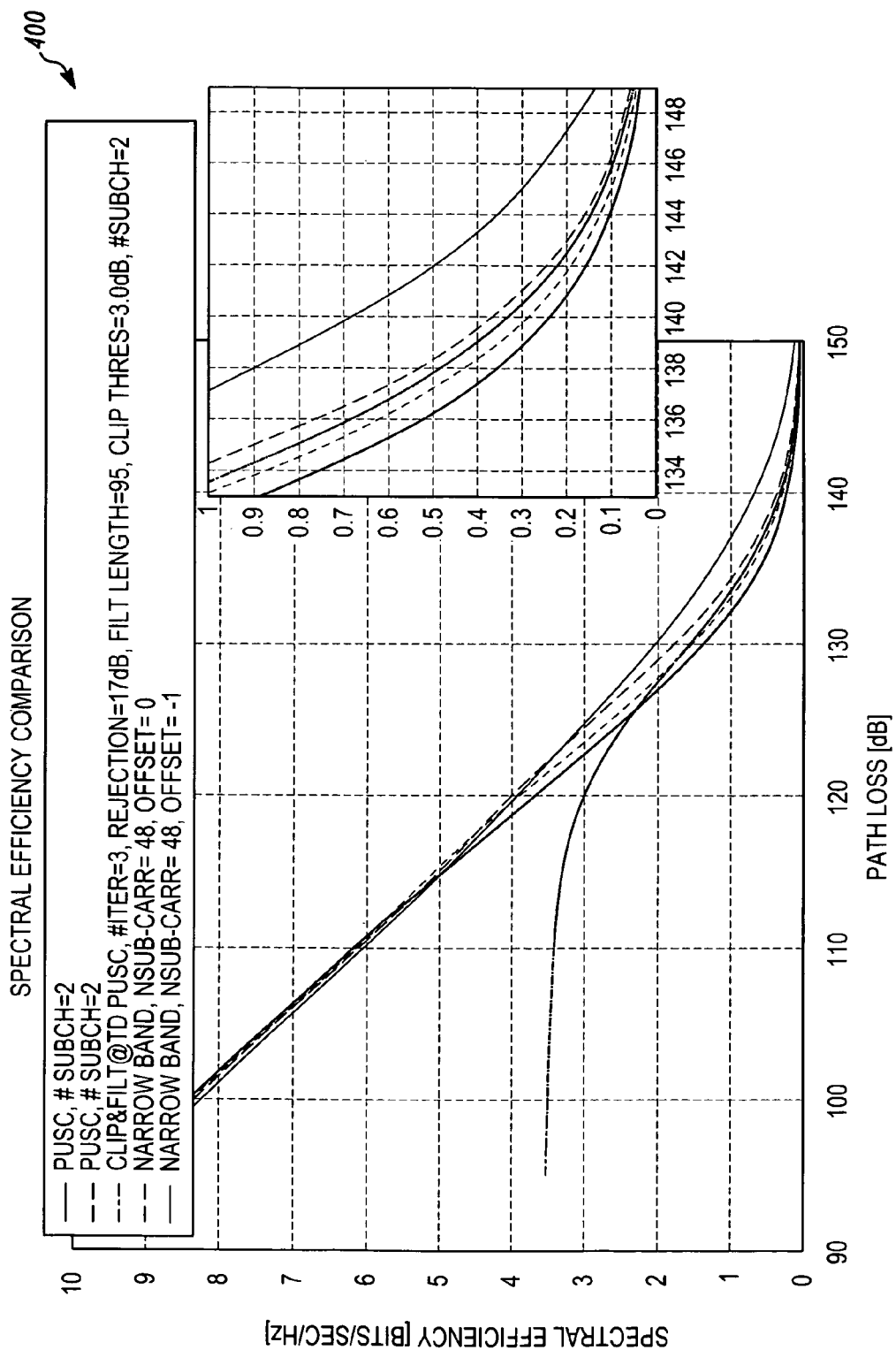
FIG. 4 is a graphical illustration showing the gain in terms of link budget of an embodiment of the present invention.

Looking now at FIG. 4 at 400 is a graphical illustration showing the gain in terms of link budget: Improvements of the Link Budget ~6 dB (vs. non-localized OFDM). This may be done with a simple and well-known OFDM demodulator. Thus, embodiments of the present invention combine OFDM modulation with strong non-linear Tx distortion and contiguous, relatively narrow, hopping sub-channelization.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. An apparatus, comprising:
a transceiver configured for orthogonal frequency-division multiple access (OFDMA) transmissions in frequency-contiguous sub-channels within a channel, wherein each sub-channel includes a continuous set of orthogonal frequency-division multiplexing (OFDM) symbols and the transceiver is configured for frequency hopping between the sub-channels, wherein a user transmits a sub-channel with a frequency bandwidth (BW) up to ⅕ of a total channel BW, and wherein the windowing and overlapping of OFDM symbols are prevented from being done at hop boundaries.

2. The apparatus of claim 1, further comprising a Power Amplifier (PA) wherein the transmissions of the sub-channels have a Power Amplifier back-off up to 0 dB, wherein and the PA back-off for an up link (UL) partial usage of subchannel (PUSC) transmission is approximately 9 dB.

3. The apparatus of claim 1, wherein said transceiver is operable in an Institute for Electrical and Electronic Engineers (IEEE) 802.16 standard.

4. The apparatus of claim 1, wherein the frequency hopping within the sub-channels occurs within a carrier frequency allocated to a user without changing the user's carrier frequency allocation.

5. A method, comprising:
transmitting information wirelessly using an orthogonal frequency-division multiple access (OFDMA) transmission in a sub-channel within a channel, wherein each sub-channel within a channel includes a continuous set of orthogonal frequency-division multiplexing (OFDM) symbols, wherein a user transmits a sub-channel with a frequency bandwidth (BW) up to ⅕ of a total channel BW;
frequency hopping between the sub-channels; and
preventing windowing and overlapping of OFDM symbols from being done at hop boundaries.

6. The method of claim 5, further comprising powering the OFDMA transmission with a power amplifier back-off up to 0 dB.

7. The method of claim 5, wherein the OFDMA transmission uses an Institute for Electrical and Electronic Engineers (IEEE) 802.16 standard.

8. An article comprising a storage medium having stored thereon instructions, that, when executed by a computing platform, results in transmitting information wirelessly using an orthogonal frequency-division multiple access (OFDMA) transmission in a sub-channel within a channel, wherein each sub-channel within a channel includes a continuous set of orthogonal frequency-division multiplexing (OFDM) symbols, wherein a user transmits a sub-channel with a frequency bandwidth (BW) up to ⅕ of a total channel BW;
frequency hopping between the sub-channels; and
preventing windowing and overlapping of OFDM symbols from being done at hop boundaries.

9. The article of claim 8, comprising further instructions that when executed further comprise powering the OFDMA transmission with a Power Amplifier back-off up to 0 dB while remaining within a regulatory spectral mask for a channel.

10. The article of claim 8, wherein the OFDMA transmission uses an Institute for Electrical and Electronic Engineers (IEEE) 802.16 standard.

11. A method, comprising:
transmitting with a transmitter in a wireless network that conforms to an IEEE 802.16 standard, the transmitter configured for an uplink (UL) orthogonal frequency-division multiple access (OFDMA) transmission in sub-channels within a channel, wherein each subchannel includes a continuous set of orthogonal frequency-division multiplexing (OFDM) symbols, wherein a user transmits a sub-channel with a frequency bandwidth (BW) up to ⅕ of a total channel BW;
frequency hopping between the sub-channels;
preventing windowing and overlapping of OFDM symbols from being done at hop boundaries; and
re-allocating sub-channels for a frequency hop after the transmission of 3 OFDM symbols.

12. The method of claim 11, further comprising powering the OFDMA transmission with a power amplifier back-off up to with an approximately 6 dB transmission power gain while remaining within a regulatory spectral mask for a channel.

* * * * *